United States Patent
Park et al.

(10) Patent No.: US 8,379,712 B2
(45) Date of Patent: Feb. 19, 2013

(54) IMAGE SEARCH METHODS FOR REDUCING COMPUTATIONAL COMPLEXITY OF MOTION ESTIMATION

(75) Inventors: Gi-ho Park, Seoul (KR); Shin-dug Kim, Goyang-si (KR); Cheong-ghil Kim, Seoul (KR); In-jik Lee, Seoul (KR); Sung-bae Park, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1635 days.

(21) Appl. No.: 11/730,278

(22) Filed: Mar. 30, 2007

(65) Prior Publication Data

US 2008/0112487 A1 May 15, 2008

(30) Foreign Application Priority Data

Nov. 9, 2006 (KR) .................. 10-2006-0110617

(51) Int. Cl.
*H04N 11/02* (2006.01)
*H04N 7/26* (2006.01)
*G06K 9/00* (2006.01)

(52) U.S. Cl. ........ 375/240; 382/190; 382/194; 382/197; 382/199; 382/201; 382/205; 382/206; 382/209; 382/216; 382/235; 382/236; 382/238; 382/282; 382/286; 382/291; 382/293; 348/355; 348/581; 348/699; 348/E5.066

(58) Field of Classification Search ................ 375/240
See application file for complete search history.

(56) References Cited

U.S. PATENT DOCUMENTS

| 5,351,095 | A | * | 9/1994 | Kerdranvat | 348/699 |
| 6,363,117 | B1 | | 3/2002 | Kok | |
| 6,414,995 | B2 | * | 7/2002 | Okumura et al. | 375/240.16 |
| 6,520,613 | B1 | * | 2/2003 | Tamura | 347/12 |
| 6,842,483 | B1 | * | 1/2005 | Au et al. | 375/240.16 |

(Continued)

FOREIGN PATENT DOCUMENTS

| JP | 10-164585 A | 6/1998 |
| KR | 10-2003-0049537 | 6/2003 |

(Continued)

OTHER PUBLICATIONS

Grünschloβ, L., 'Motion Blur', Faculty of Engineering and Computer Sciences, Ulm University, Germany, Apr. 3, 2008, entire document, http://gruenschloss.org/motion-blur/motion-blur.pdf.*

(Continued)

*Primary Examiner* — Edan Orgad
*Assistant Examiner* — Ronald Baum
(74) *Attorney, Agent, or Firm* — Harness, Dickey & Pierce, P.L.C.

(57) ABSTRACT

An image search method may include: determining a quadrant of a predicted motion vector; calculating a tilt value of a first reference frame and a tilt value of a second reference frame using the predicted motion vector; deciding a search area for uneven hexagon search in response to the quadrant of the predicted motion vector and the calculated tilt values; performing the uneven hexagon search with respect to the decided search area; and/or comparing a result of the performed uneven hexagon search with a threshold value to determine termination of the uneven hexagon search. The second reference frame is earlier-in-time relative to the first reference frame.

20 Claims, 5 Drawing Sheets

U.S. PATENT DOCUMENTS

| | | | |
|---|---|---|---|
| 6,954,544 B2 * | 10/2005 | Jepson et al. | 382/107 |
| 7,020,201 B2 * | 3/2006 | Luo et al. | 375/240.16 |
| 7,072,398 B2 * | 7/2006 | Ma | 375/240.16 |
| 7,869,518 B2 * | 1/2011 | Kim et al. | 375/240.16 |
| 2006/0056511 A1 * | 3/2006 | Rehan et al. | 375/240.12 |
| 2007/0047653 A1 * | 3/2007 | Kim et al. | 375/240.16 |
| 2007/0121728 A1 * | 5/2007 | Wang et al. | 375/240.18 |
| 2007/0133690 A1 * | 6/2007 | Xin et al. | 375/240.24 |
| 2010/0253793 A1 * | 10/2010 | Auberger et al. | 348/208.4 |

FOREIGN PATENT DOCUMENTS

KR    10-2004-0035390    4/2004

OTHER PUBLICATIONS

Wei Ni et al. "Motion Vector Field and Direction Adaptive Search Technique for Motion Estimation". Journal of Information & Computational Science 2: 3 (2005) pp. 547-558.

Paolo de Pascalis et al. "Fast Motion Estimation With Size-Based Predictors Selection Hexagon Search in H.264/AVC Encoding". Paper No. 1328, $12^{th}$ European Signal Processing Conference, 2004.

Lee, In-Jik et al., "Fast Uneven Multi-Hexagon-Grid Search Algorithm for Integer Pel Motion Estimation of H.264", pp. 153-156 and English translation.

* cited by examiner

IMAGE SEARCH METHODS FOR REDUCING COMPUTATIONAL COMPLEXITY OF MOTION ESTIMATION

This application claims priority from Korean Patent Application No. 10-2006-0110617, filed on Nov. 9, 2006, in the Korean Intellectual Property Office (KIPO), the entire contents of which are incorporated herein by reference.

BACKGROUND

1. Field

Example embodiments relate to moving picture compression. Also, example embodiments relate to image search methods capable of performing motion estimation used for moving picture compression at high speed.

2. Description of Related Art

Advances in techniques associated with digital signal processing, storage mediums, and methods of transfer have resulted in development into multimedia services from services that were typically limited to voice information. Many approaches for compression have been developed to store and transfer massive quantities of data. In particular, in the latter half of the 1980's, technological enhancement was accelerated according to needs for coding and storage technique standards of digital moving picture information. The International Telecommunication Union (ITU) established H.261 and H.263 as the standards for moving picture services for wire and wireless telecommunication network systems, and the International Organization for Standardization (ISO) made MPEG-1, MPEG-2, and MPEG-4 the moving picture standards. As wireless communications continue to rapidly spread out, moving picture compression technique standards are needed that provide improved compression efficiency compared with related art compression methods and that accommodate various telecommunications systems. In recent years, H.264, established by the ITU and ISO, brought about improvement compared with related art standards such as MPEG-2, MPEG-4 (Part 2), and the like in the aspects of flexibility, ease of compatibility with various networks, and coding efficiency with moving pictures.

H.264 was developed for the purpose of providing improved image quality relative to related art video compression standards. The basic concept of H.264 is similar to that of H.263 and MPEG-4, but the details of implementation of H.264 are significantly different. For example, in the case of motion estimation/compensation, H.263 provides blocks whose sizes are equal to each other, while H.264 provides blocks whose shapes and sizes may be different from each other. Since H.264 supports a quarter pixel, it is possible to effectively reduce the amount of surplus data that is produced via motion estimation as compared with related art standards. As a result, H.264 has 2.3 times higher compression efficiency than that of MPEG-2 and 1.5 to 2 times higher compression efficiency than that of MPEG-4. However, due to applying various block modes with respect to a plurality of reference images and conducting motion estimation, H.264 has drawbacks including quantity and complexity of computations. For example, the complexity of calculations in H.264 is approximately sixteen times higher than in MPEG-4 SP (Simple Profile).

When encoding using H.264, a motion estimation (ME) portion requires a large quantity of computations and takes up a lot of time. For example, in the case of using five reference images for motion estimation, the motion estimation takes about 80% of the total encoding time. Therefore, there is a need for a technique to effectively reduce the quantity of motion estimation computations in order to use H.264 compression technique for real-time applications.

SUMMARY

Example embodiments may provide image search methods capable of performing motion estimation at high speed.

According to example embodiments, image search methods may include determining a quadrant of a predicted motion vector; calculating a tilt value of a first reference frame and a tilt value of a second reference frame using the predicted motion vector; deciding a search area for uneven hexagon search in response to the quadrant of the predicted motion vector and the calculated tilt values; performing the uneven hexagon search with respect to the decided search area; and/or comparing a result of the performed uneven hexagon search with a threshold value to determine termination of the uneven hexagon search. The second reference frame may be earlier-in-time relative to the first reference frame.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
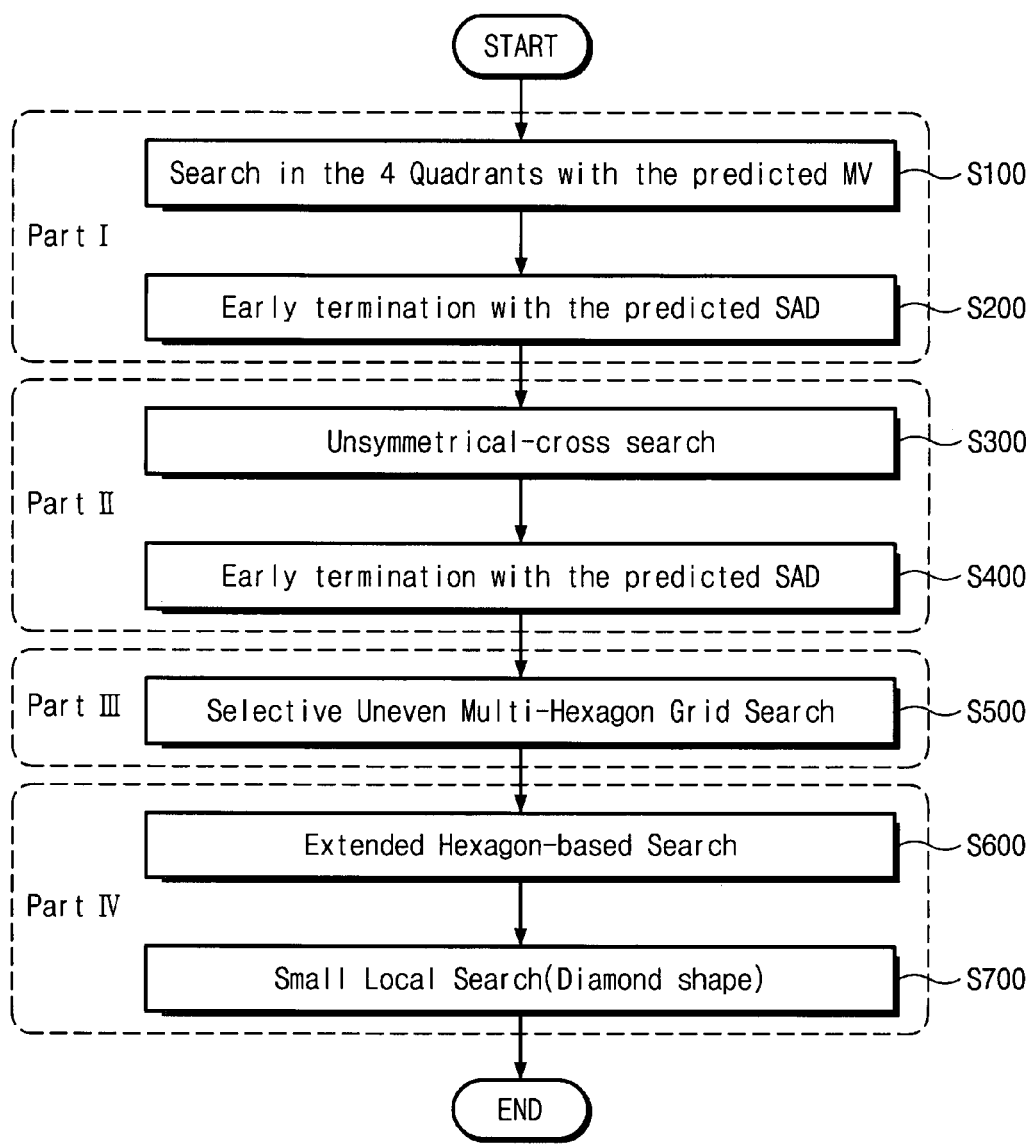
FIG. 1 is a flowchart showing an image search method for motion estimation at high speed according to example embodiments.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," or "coupled to" to another component, it may be directly on, connected to, or coupled to the other component or intervening components may be present. In contrast, when a component is referred to as being "directly on," "directly connected to," or "directly coupled to" another component, there are no intervening components present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element component, region, layer, and/or section from another element, component, region, layer, and/or section. For example, a first element, component, region, layer, and/or section could be termed a second element, component, region, layer, and/or section without departing from the teachings of the example embodiments.

Spatially relative terms, such as "beneath," "below," "lower," "above," "upper," and the like may be used herein for ease of description to describe a relationship or relationships between one component and/or feature and another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which may be illustrated in the accompanying drawings, wherein like reference numerals may refer to like components throughout.

According to example embodiments, a selective uneven multi-hexagon grid search (UMHGS) may be performed in which a quantity of search data and/or a quantity of computations is reduced. In the UMHGS, a search area may be limited to, for example, a quarter area or half area based on a magnitude of a slope of a motion vector predicted from a current reference frame and a previous reference frame and/or on sign(s) of x and/or y components of the predicted motion vector. Accordingly, a quantity of search data and/or a quantity of computations may be reduced as compared to related art quantities, so that high-speed image search may be achieved. In addition, it may be possible to further improve the image search speed by selectively skipping the UMHGS operation.

Figure 2:
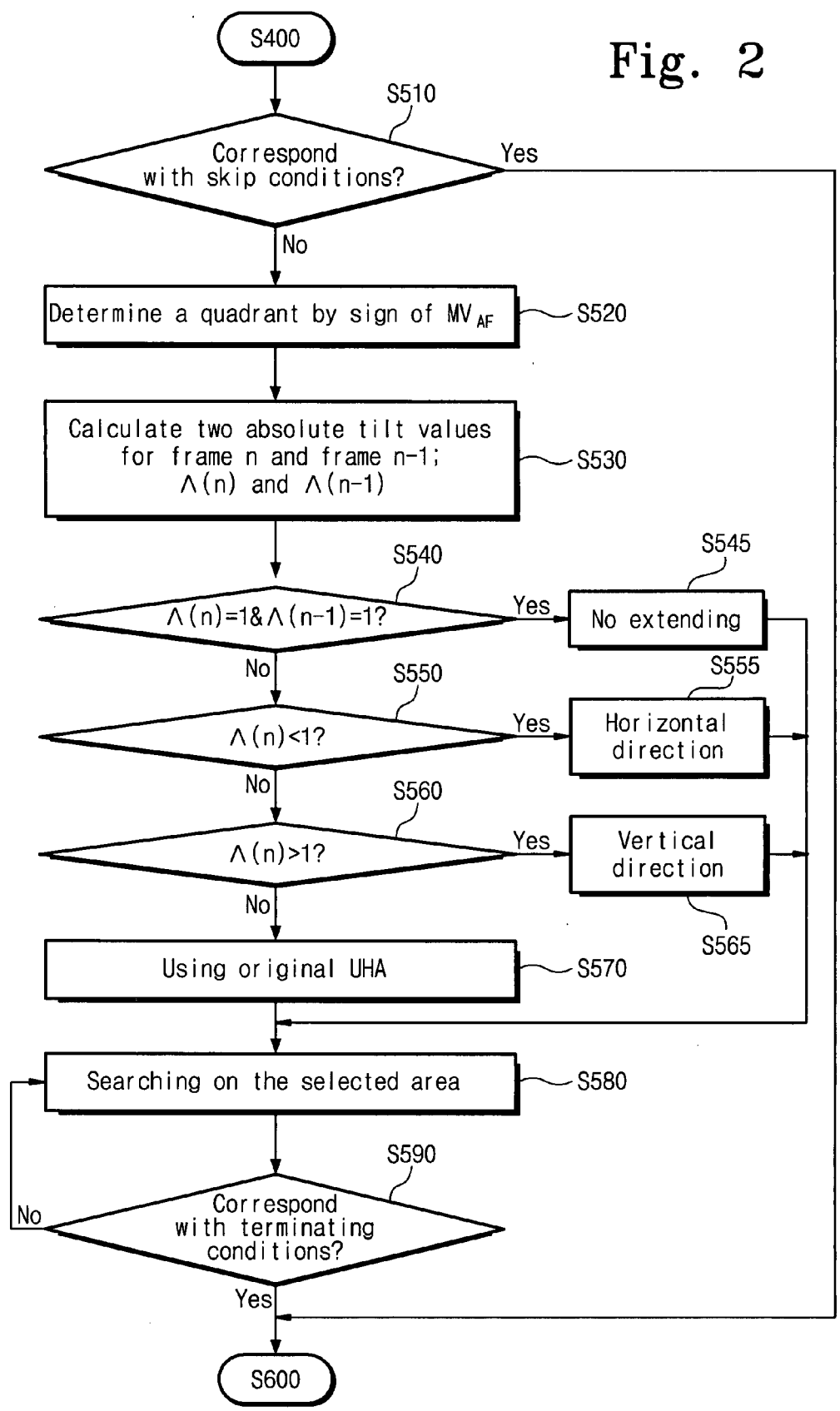
FIG. 2 is a flowchart showing an operation that may be carried out at Part III of FIG. 1.
Figure 3:
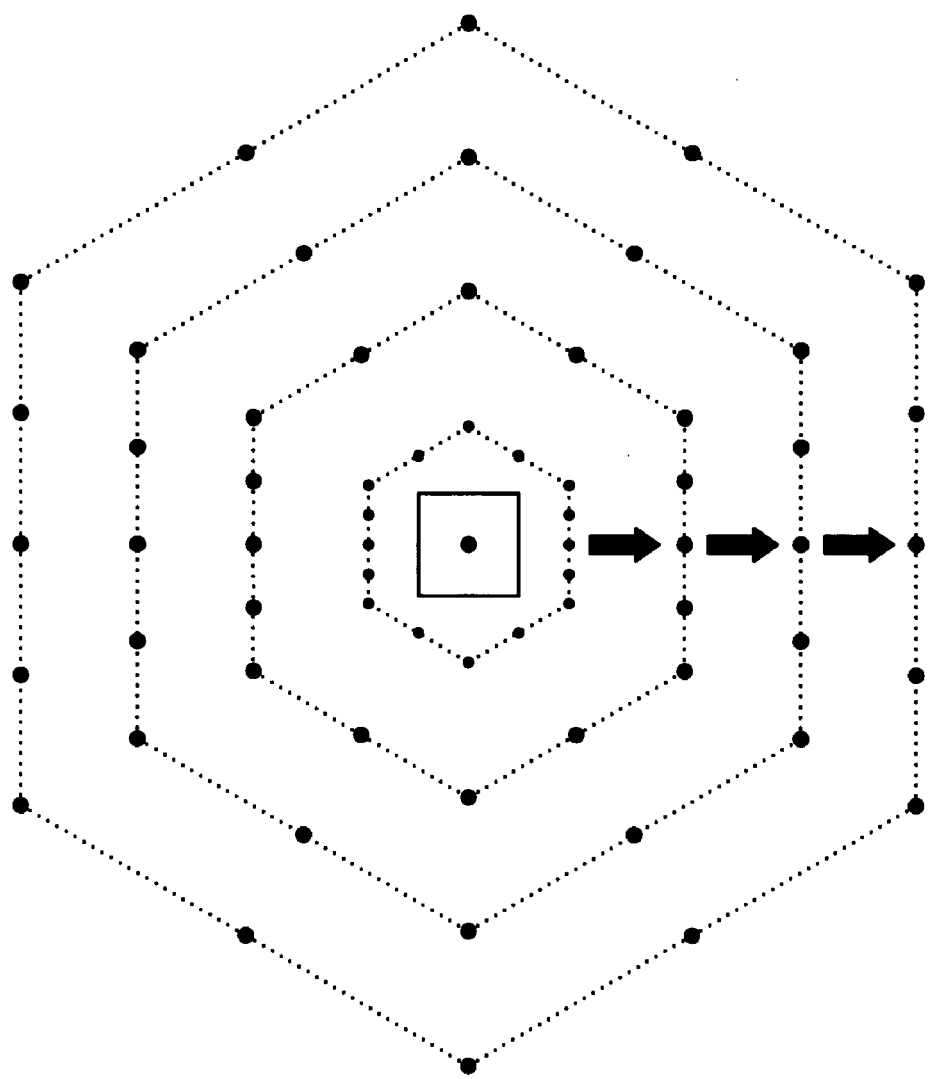
FIGS. 3 and 4(a)-4(e) are diagrams showing a range of uneven multi-hexagon grid search (UMHGS) search areas according to example embodiments.
Figure 4:
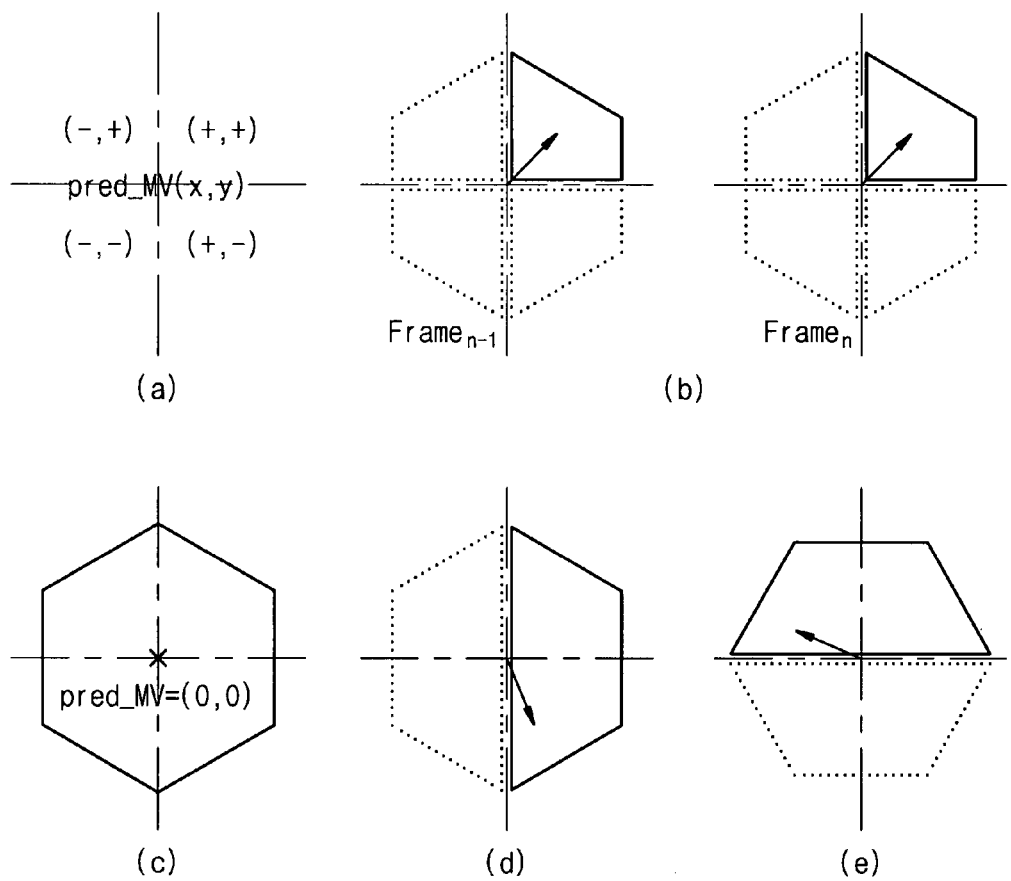

FIG. 1 is a flowchart showing an image search method for motion estimation at high speed according to example embodiments, FIG. 2 is a flowchart showing an operation that may be carried out at Part III of FIG. 1, and FIGS. 3 and 4(*a*)-4(*e*) are diagrams showing a range of UMHGS search areas according to example embodiments. Image search methods for performing motion estimation at high speed and search areas according to example embodiments are illustrated in FIGS. 1 to 4(*a*)-4(*e*).

Referring to FIG. 1, image search methods according to example embodiments may be classified into four parts. In Part I, an image search operation may be performed using four starting search quadrants with a predicted motion vector (S100). In step S200, it may be determined whether to early terminate the image search operation for motion estimation via zero block search using a predicted sum of absolute difference (SAD) value. If it is determined to early terminate the image search operation, then Parts II and/or III may be skipped and the procedure may go to Part IV. The method for predicting the motion vector and SAD may include, for example, median prediction, up-layer prediction, corresponding-block prediction, neighboring reference frame prediction, and the like.

In Part II, unsymmetrical cross-search may be performed to cover, for example, general motion. Because, in a natural picture sequence, motion in a horizontal direction may occur more often than motion in a vertical direction, an optimum motion vector may be well predicted via the unsymmetrical cross-search. Therefore, in the case of the unsymmetrical cross-search, motion in the horizontal direction may be weighted more than motion in the vertical direction. For example, a weight W may be applied to motion in the horizontal direction and a weight W/2 may be applied to motion in the vertical direction. A motion vector with minimum SAD value may be determined through the unsymmetrical cross-search performed in step S300. In subsequent step S400, it may be determined whether to early terminate the image search operation for motion estimation via zero block search using the predicted SAD value. If it is determined to early terminate the image search operation, then Part III may be skipped and the procedure may go to Part IV.

As described above, according to the image search methods of the example embodiments, Part III may be selectively performed based on the results of the zero block search(es) made in Part I and/or Part II, so that the quantity of data computations and/or the computation time may be reduced. However, in the event that Part III is skipped after the completion of both Part I and Part II, the reduction may not be very significant. For example, the reduction in quantity of data computations and/or computation time may be less than 2%. However, in the case of the example embodiments, it may be possible to reduce search time needed for motion estimation by early terminating image search of a UMHGS operation in Part III, where most of the computation of motion estimation is performed, and by limiting search to a specific portion of the search area. Hereinafter, the UMHGS algorithm according to example embodiments is called "selective UMHGS".

The selective UMHGS performed in Part III may utilize spatial correlation and/or temporal correlation between adjacent blocks in a video frame. Therefore, the example embodiments may perform the selective UMHGS, for example, using the predicted motion vector and/or statistically analyzed SAD value (i.e., used as a threshold value). A threshold value used for the selective UMHGS may be calculated by classifying minimum SAD values, predicted from a plurality of moving pictures (referred to as benchmark), every variable block size and/or analyzing their statistics. A threshold value previously calculated by testing may be used to determine whether the selective UMHGS performed in Part III should be early terminated.

As will be described in detail below, the selective UMHGS method according to the example embodiments may limit search to a quarter or half of a search area, for example, in the uneven hexagon area (UHA) of FIG. 3, using a tilt value of a motion vector with respect to a block that may be placed at the same position as a current block in a previous frame or of a motion vector that may be obtained in a coding step of a top variable block mode. As a result, it may be possible to reduce the quantity of computations and/or to perform a motion estimation operation at high speed. A selective UMHGS method according to the example embodiments is discussed below.

Referring to FIG. 2, if it is determined not to early terminate the image search operation in step S400, in the case of the selective UMHGS method of the example embodiments, the minimum SAD value predicted in step S300 may be compared with the threshold value calculated by testing, and whether the selective UMHGS is to be skipped may be determined according to the comparison result (S510). For example, if the minimum SAD value is greater than the threshold value, the procedure may go to step S600. In this case, steps S520 to S590 may be skipped. If the minimum SAD value is less than or equal to the threshold value, then a quadrant of the motion vector $MV_{AF}$ may be determined in step S520. This determination may be based, for example, on the sign(s) (i.e., + and/or −) of the x and/or y components of the predicted motion vector $MV_{AF}$ as shown, for example, in FIG. 4(a). An example of the motion vector $MV_{AF}$ used in step S520 may be similar to that in FIG. 4(b). The quadrant of the motion vector determined in step S520 may be used to determine whether a quarter UHA or half UHA, in which the search may be performed, exists in any direction.

In step S530, two absolute tilt values, $\Lambda(n)$ and $\Lambda(n-1)$, are calculated with respect to reference frames n and n−1, respectively. Herein, the reference frame n indicates a current reference frame (hereinafter referred to as a first reference frame), and the reference frame (n−1) indicates a previous reference frame (hereinafter referred to as a second reference frame). The symbol $\Lambda(n)$ represents an absolute tilt value (hereinafter, referred to as a first tilt value) of the motion vector $MV_{AF}$ in the first reference frame, and the symbol $\Lambda(n-1)$ represents an absolute tilt value (hereinafter, referred to as a second tilt value) of the motion vector $MV_{AF}$ in the second reference frame. The first tilt value may be calculated by equation (1) below, and the second tilt value may be calculated by equation (2) below.

$$\Lambda(n)=|\overrightarrow{MV_{AFy(n)}}|/|\overrightarrow{MV_{AFx(n)}}| \quad (1)$$

$$\Lambda(n-1)=|\overrightarrow{MV_{AFy(n-1)}}|/|\overrightarrow{MV_{AFx(n-1)}}| \quad (2)$$

Herein, $MV_{AFx(n)}$ and $MV_{AFy(n)}$ represent the x and y components of $MV_{AF}$ in the $n^{th}$ reference frame, respectively, and $MV_{AFx(n-1)}$ and $MV_{AFy(n-1)}$ represent the x and y components of $MV_{AF}$ in the $(n-1)^{st}$ reference frame, respectively. The first tilt value $\Lambda(n)$ and the second tilt value $\Lambda(n-1)$ may be used to decide a search area in which the selective UMHGS may be performed.

In order to decide the search area in which the selective UMHGS may be performed, it may be determined whether or not the first tilt value $\Lambda(n)$ and the second tilt value $\Lambda(n-1)$ are both equal to one (S540). If the first tilt value $\Lambda(n)$ and the second tilt value $\Lambda(n-1)$ are both equal to one, the search area may be decided to be one quarter of a UHA, and the search area may not need to be extended (S545). In that case, the procedure may go to step S580. If the first tilt value $\Lambda(n)$ and the second tilt value $\Lambda(n-1)$ are not both equal to one, the procedure may go to step S550.

When the first tilt value $\Lambda(n)$ and the second tilt value $\Lambda(n-1)$ are both equal to one, then the predicted motion vector $MV_{AF}$ may be concentrated, for example, in a specific portion of a UHA. Therefore, in the case of the example embodiments, instead of searching all UHAs, a specific UHA may be searched with high probability that a block matched with the predicted motion vector $MV_{AF}$ exists. In this case, for example, an area where the selective UMHGS is to be performed in the first and second reference frames may be illustrated in FIG. 4(b), and the search area may be, for example, only a quarter of the UHA of FIG. 3.

In step S550, it may be determined whether or not the first tilt value $\Lambda(n)$ is less than one. If the first tilt value $\Lambda(n)$ is less than one, the search area may be decided, for example, to be one half of a UHA, and the search area may be extended in a horizontal direction (S555) as illustrated, for example, in FIG. 4(e). In this case, the procedure may go to step S580. If the first tilt value $\Lambda(n)$ is not less than one, the procedure may go to step S560.

In step S560, it may be determined whether or not the first tilt value $\Lambda(n)$ is greater than one. If the first tilt value $\Lambda(n)$ is greater than one, the search area may be decided, for example, to be one half of a UHA, and the search area may be extended in a vertical direction (S565) as illustrated, for example, in FIG. 4(d). In this case, the procedure may go to step S580. If the first tilt value $\Lambda(n)$ is not greater than one, the procedure may go to step S570.

In step S570, the first tilt value $\Lambda(n)$ is equal to one, but the second tilt value $\Lambda(n-1)$ is not equal to one. In this case, for example, the search area may be decided to be the UHA of FIG. 3. In step S580, the UMHGS may be performed within the selected search area after the search area is decided in steps S520 to S570. As the UMHGS is performed, the SAD value may be updated.

After the UMHGS is completed, it may be determined whether the UMHGS operation should be terminated by comparing a newly obtained SAD value with the threshold value calculated by testing (S590). If the SAD value is more than the threshold value, the UMHGS operation in Part III may be terminated. If the SAD value is not more than the threshold value, the procedure may go back to step S580.

In Part IV, extended hexagon-based search (EHS) and small local search (SLS) may be performed in order to increase the accuracy of the motion vector (S600, S700). The EHS and/or SLS may be performed continuously. The SLS may be, for example, based on a diamond shape. A search operation performed in Part IV may be made, for example, within an area obtained by extending a search area (a quarter area, a half area, or an entire UHA) decided in Part III. A range of the UHA may be stepwise extended as illustrated, for example, by arrows in FIG. 3.

Figure 5:
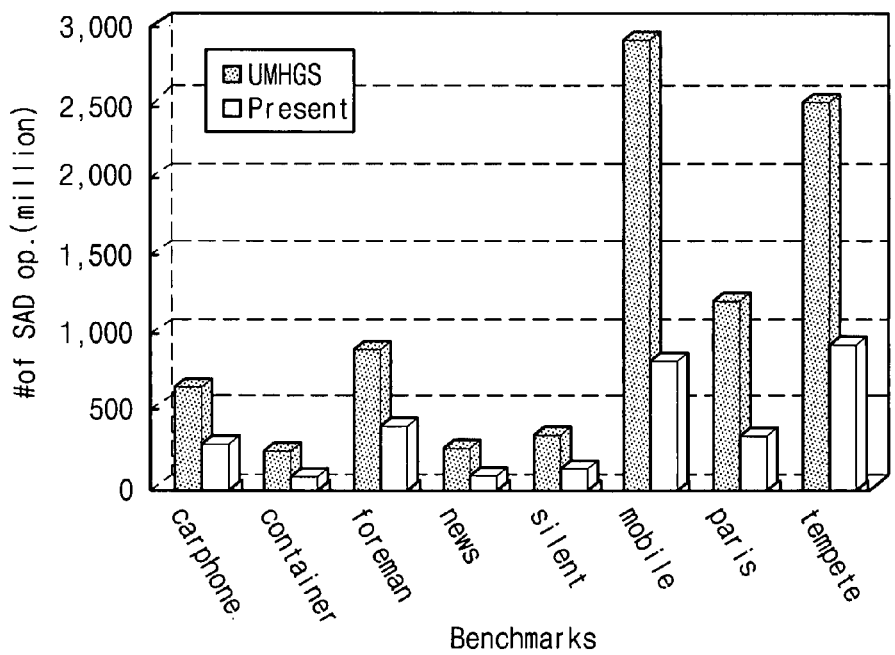
FIG. 5 is a graph showing sum of absolute difference (SAD) computation quantities according to a selective UMHGS of example embodiments and SAD computation quantities according to related art image searches.
Figure 6:
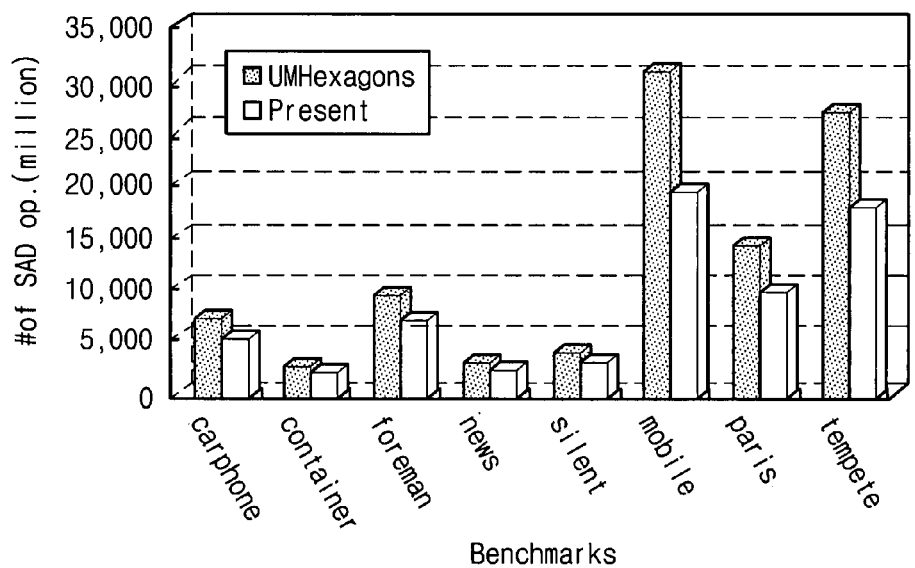
FIG. 6 is a graph showing SAD computation quantities according to image searches for motion estimation of example embodiments and SAD computation quantities according to related art image searches for motion estimation.

FIG. 5 is a graph showing SAD computation quantities according to a selective UMHGS of example embodiments and SAD computation quantities according to related art image searches, and FIG. 6 is a graph showing SAD computation quantities according to image searches for motion estimation of example embodiments and SAD computation quantities according to related art image searches for motion estimation. FIG. 6 illustrates SAD computation quantities for a case in which the selective UMHGS according to the example embodiment of FIG. 2 is adopted as compared to a case in which the selective UMHGS according to the example embodiment of FIG. 2 is not adopted.

Referring to FIGS. 5 and 6, if a partial area of a UHA is searched using the selective UMHGS algorithm according to the example embodiments, the computation quantities may be significantly reduced when compared to a case in which the entire UHA is searched. In general, the UMHGS may be divided into two operations. One is a search operation with respect to twenty-five points, and the other is a search operation with respect to a UHA that includes sixteen points. The UMHGS operation, needing a large quantity of computations, may be selectively performed via the selective UMHGS according to the example embodiments. In particular, a search area in which UMHGS is performed, may be limited to a quarter area or a half area based on absolute tilt values $\Lambda(n)$ and $\Lambda(n-1)$ of motion vector $MV_{AF}$ and/or on the sign(s) of the x and/or y components of the predicted motion vector $MV_{AF}$. Accordingly, it may be possible to perform image search at high speed by significantly reducing the quantity of search data and/or the quantity of computations. In addition, since the UMHGS operation may be selectively skipped, the image search speed may be further improved.

While example embodiments have been particularly shown and described, it will be understood by those of ordinary skill in the art that various changes in form and details may be made therein without departing from the spirit and scope of the present invention as defined by the following claims.

What is claimed is:

1. An image search method, comprising:
    determining, in a processor, a quadrant of a predicted motion vector;
    calculating, in the processor, a tilt value of a first reference frame and a tilt value of a second reference frame using the predicted motion vector;
    deciding, in the processor, a search area for uneven hexagon search in response to the quadrant of the predicted motion vector and the calculated tilt values;
    performing, in the processor, the uneven hexagon search with respect to the decided search area; and
    comparing, in the processor, a result of the performed uneven hexagon search with a threshold value to determine termination of the uneven hexagon search;
    wherein the quadrant of the predicted motion vector is defined by an angular displacement of the predicted motion vector, and
    wherein the second reference frame is earlier-in-time relative to the first reference frame.

2. The method of claim 1, further comprising:
    before determining the quadrant of the predicted motion vector, comparing a sum of absolute difference (SAD) value corresponding to the predicted motion vector with the threshold value to determine whether to skip the uneven hexagon search.

3. The method of claim 2, wherein the uneven hexagon search is skipped when the SAD value is greater than the threshold value.

4. The method of claim 1, wherein the threshold value is obtained by statistically calculating sum of absolute difference (SAD) values of a plurality of reference images.

5. The method of claim 1, wherein a predicted motion vector of the first reference frame includes a non-zero x-component,
    wherein the predicted motion vector of the first reference frame includes a y-component,
    wherein 'n' indicates the first reference frame,
    wherein the x-component of the predicted motion vector of the first reference frame is represented by $MV_{AFx(n)}$,
    wherein the y-component of the predicted motion vector of the first reference frame is represented by $MV_{AFy(n)}$,
    wherein the tilt value of the first reference frame is represented by $\Lambda(n)$, and
    wherein the tilt value of the first reference frame is $$\Lambda(n) = |\overrightarrow{MV_{AFy(n)}}|/|\overrightarrow{MV_{AFx(n)}}|.$$

6. The method of claim 1, wherein a predicted motion vector of the second reference frame includes a non-zero x-component,
    wherein the predicted motion vector of the second reference frame includes a y-component,
    wherein 'n−1' indicates the second reference frame,
    wherein the x-component of the predicted motion vector of the second reference frame is represented by $MV_{AFx(n-1)}$,
    wherein the y-component of the predicted motion vector of the second reference frame is represented by $MV_{AFy(n-1)}$,
    wherein the tilt value of the second reference frame is represented by $\Lambda(n-1)$, and
    wherein the tilt value of the second reference frame is $$\Lambda(n-1) = |\overrightarrow{MV_{AFy(n-1)}}|/|\overrightarrow{MV_{AFx(n-1)}}|.$$

7. The method of claim 1, wherein in deciding the search area for the uneven hexagon search, when the tilt value of the first reference frame is equal to one and the tilt value of the second reference frame is equal to one, a ¼ area of an entire uneven hexagon area corresponding to the quadrant of the predicted motion vector is decided as the search area.

8. The method of claim 1, wherein in deciding the search area for the uneven hexagon search, when the tilt value of the first reference frame is less than one, a ½ area of an entire uneven hexagon area corresponding to the quadrant of the predicted motion vector is decided as the search area.

9. The method of claim 8, wherein the ½ area is an area extended in a horizontal direction within the entire uneven hexagon area.

10. The method of claim 1, wherein in deciding the search area for the uneven hexagon search, when the tilt value of the first reference frame is greater than one, a ½ area of an entire uneven hexagon area corresponding to the quadrant of the predicted motion vector is decided as the search area.

11. The method of claim 10, wherein the ½ area is an area extended in a vertical direction within the entire uneven hexagon area.

12. The method of claim 1, wherein in deciding the search area for the uneven hexagon search, when the tilt value of the first reference frame is equal to one and the tilt value of the second reference frame is not equal to one, an entire uneven hexagon area is decided as the search area.

13. The method of claim 1, wherein when the result of the performed uneven hexagon search is greater than the threshold value, the uneven hexagon search is terminated.

14. The method of claim 1, wherein when the result of the performed uneven hexagon search is less than or equal to the threshold value, the uneven hexagon search is repeated.

15. The method of claim 1, wherein the result of the performed uneven hexagon search is used for motion estimation.

16. The method of claim 1, wherein the uneven hexagon search follows a H.264 standard.

17. The method of claim 1, further comprising:
    an extended hexagon-based search.

18. The method of claim 17, wherein the extended hexagon-based search is performed continuously.

19. The method of claim 1, further comprising:
    a small local search.

20. The method of claim 19, wherein the small local search is performed continuously.

* * * * *